Jan. 21, 1930.          L. G. COPEMAN          1,744,038
                        REFRIGERATING UNIT
                        Filed Nov. 25, 1927
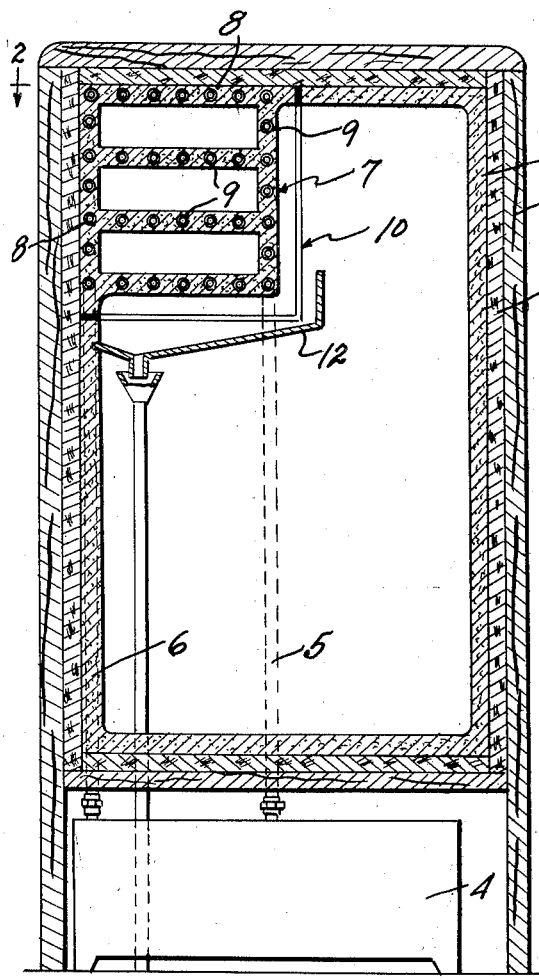
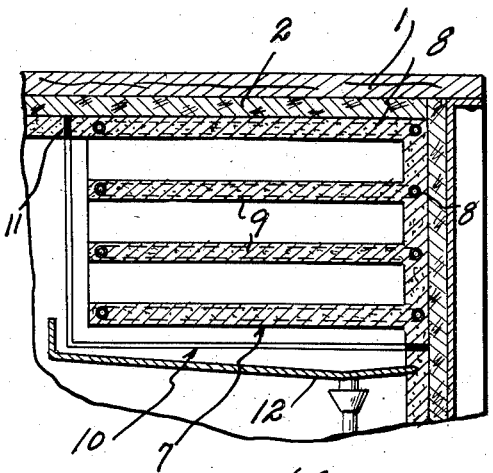
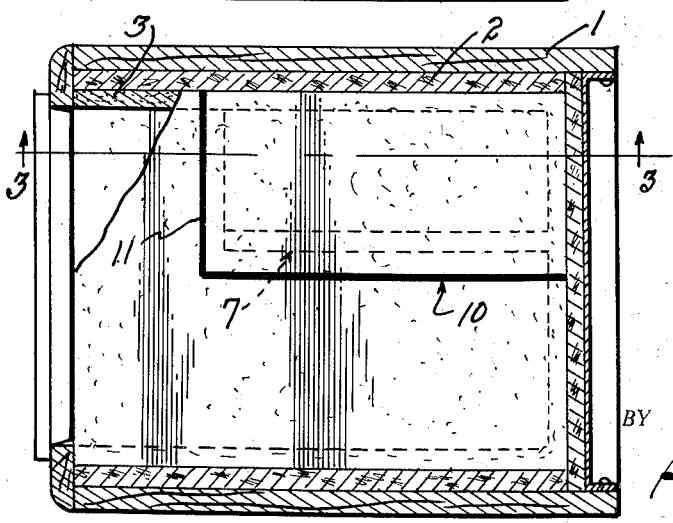
INVENTOR.
Lloyd G. Copeman
BY
ATTORNEY.

Patented Jan. 21, 1930

1,744,038

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

REFRIGERATING UNIT

Application filed November 25, 1927. Serial No. 235,633.

This invention relates to a refrigerating unit and has to do particularly with a domestic refrigerating unit of the one door cabinet type, and novel manner of forming, positioning and isolating the cooling unit.

Domestic refrigerating units of the type having the interior walls formed of cast stone, and the sharp freezing chamber or "lowsides" formed integrally with the stone walls are illustrated and described in my copending applications #116.321 and #116,322, filed June 16, 1926. Refrigerating units of the type disclosed in the above mentioned application have been very successful as to their refrigerating efficiency and capacity, but due to the high conductivity of the stone walls which are formed contiguous with the integral sharp freezing chambers, some difficulty has been experienced due to the spreading of the frost area and the melting of the frost during the defrosting period. This difficulty is particularly true in the type of refrigerating cabinet known as the one door type where the food compartment and low side or sharp freezing chamber are all formed in the same space.

It is the object of the present invention to obviate the spreading of the frost area in domestic refrigerating cabinets of the above mentioned type, particularly where the low side or sharp freezing chamber is formed integrally with the lining of the cabinet. This is preferably accomplished by means of an insulating strip which is positioned adjacent the refrigerating coils embedded in the stone lining and sharp freezing chamber, the insulating strip extending completely around the area in which the coils are embedded and extending transversely of the lining of the cabinet.

In the drawings:

Fig. 1 illustrates a typical one door domestic refrigerating unit embodying my novel invention and illustrating one manner of forming the "low-side" and sharp freezing chamber integrally with the walls of the cabinet.

Fig. 2 is a section taken on line 2—2 of Fig. 1.

Fig. 3 is a section taken on line 3—3 of Fig. 2.

It will be understood that my novel manner of isolating the integrally formed "lowside" and preventing the spread of the frost area can be embodied in any number of different arrangements such as in single compartment boxes or in multiple compartment boxes, such as shown in my copending application #116,321. However, the present invention is especially adaptable to one compartment boxes. In order to best illustrate the invention the drawings are limited to a one compartment box.

The refrigerator proper may be constructed of a suitable wood frame 1 and lined with a suitable insulating lining 2 which may be formed of cork boards or other suitable insulating material. The exterior surface of the frame 1 may be covered with artificial stone either by spraying or casting, or may be enameled, and the interior shell or surface of the cabinet, which may be designated 3, is preferably formed by casting an artificial stone composition such as oxy-chloride cement directly to the surfaces of the shell 2. This lining 3 may be cast in the mold formed by the frame 1 and the shell 2 by means of suitable cores in the well known manner. This oxy-chloride cement may consist of a mixture of magnesium oxide, fine sand or ground flint, or both, to which is added sufficient magnesium chloride to make a material that will be plastic or will pour. However, it will be understood that any suitable artificial stone or similar material may be used in carrying out the invention.

A suitable refrigerator unit is diagrammatically illustrated, as at 4, and suitable inlet and outlet pipes 5 and 6 extend upwardly adjacent the cork lining 2 and terminate in a sharp freezing chamber which may be generally designated 7. The coils of pipe leading from the refrigerating unit not only extend back and forth adjacent the cork lining, as at 8, but also extend back and forth, as at 9, to define suitable sharp freezing compartments for receiving ice cube trays and the like. In forming the interior wall of the refrigerator, the coils of pipes 5 and 6, and the coils 8 and 9 are preferably embedded in the cast stone walls, but it will be understood that a portion or all of the coils may be merely positioned in heat transferring relation to the stone walls and sharp freezing compartment instead of embedded therein.

In the particular drawings the "low-side" or sharp freezing chamber, generally designated 7, is shown in position in the upper left hand corner and slightly spaced from the front of the box, as shown in Fig. 2, but it will be understood that such "low-side" or sharp freezing chamber may be positioned any place desired in or adjacent the compartment or compartments of the refrigerating cabinet. Surrounding and completely isolating the "low-side" or sharp freezing unit from the remainder of the stone walls of the cabinet, is an insulating member which may be generally designated 10. This member extends along the side wall and top wall, adjacent the unit 7, as shown in Fig. 3, and it extends along the top wall in front of and at one side of the unit 7, as shown in Fig. 2. It will thus be obvious that the insulating strip completely isolates the portion of the integrally formed wall constituting the "low-side" or sharp freezing unit, from the remainder of the inner wall of the cabinet.

It will be obvious that the front insulating strip, designated 11 and located in the top wall, may be dispensed with where the sharp freezing chambers extend completely to the front of the cabinet. It will thus be seen that in the operation of the unit that the transmission of the heat units will be substantially segregated or isolated to that portion of the chamber which represents the "low-side" or sharp freezing chamber. In other words, the area over which frost will form will be limited to that area defined by the insulating strip.

A suitable drip pan 12 may be positioned beneath the part of the inner shell 3, represented by the "low-side" unit 7 whereby any water resulting from a defrosting operation will be conveyed away leaving the food compartment dry and clean.

It will be understood that the continuity between the portion of the inner walls of the cabinet represented by the unit 7 and that of the remainder of the inner walls of the cabinet, may be broken by any suitable means, as long as the major portion of the food compartment is isolated from the cooling unit to limit and positively define the frosting unit.

Claims:

1. A refrigerating apparatus having refrigerant conducting means extending within the cabinet, and an artificial stonework lining for said cabinet and positioned in heat conducting relation with said refrigerant conducting means of the refrigerating apparatus whereby to form a cooling unit, and insulating means for separating the stonework lining positioned in heat conducting relation with said refrigerant conducting means from the remainder of the stonework lining forming the food compartment or compartments of the cabinet.

2. In a refrigerating unit, the combination of a cabinet, a plastically applied lining therefor defining one or more food chambers and a cooling unit, refrigerating means positioned in heat conducting relation with that part of the plastically applied lining defining the cooling unit, and means for insulating the part of the plastically applied means defining the cooling unit from the remainder of the chamber or chambers to limit the frost area.

3. A refrigerating unit, comprising in combination, a cabinet, a plastically applied shell therefor defining one or more food compartments and a cooling unit, refrigerating means positioned in heat conducting relation with that portion of the shell defining the cooling unit, and means for breaking the conductivity of the heat between the said portion of the plastically applied shell defining the cooling unit and the portion of the shell defining the compartment or compartments.

4. In a refrigerating unit, the combination of a cabinet, a molded inner shell of stone and a cooling unit of stone molded simultaneously with said inner shell, and insulating means inserted between adjacent surfaces of said shell and said cooling unit for breaking the conductivity of heat between the two.

5. A refrigerating unit, comprising in combination, a cabinet, a lining therefor formed of material having a relatively high heat conductivity, a cooling unit positioned in heat conducting relation to said lining, refrigerant conducting means positioned in heat conducting relation with said cooling unit, and means in the lining for insulating the lining adjacent said cooling unit from remainder of the lining of said cabinet.

6. A refrigerating unit, comprising in combination, a cabinet, a cast stone lining for said cabinet, a cast stone sharp freezing chamber simultaneously formed therein, part of the walls thereof being formed by the walls of the cabinet, refrigerant conducting means embedded in the walls of said sharp freezing chamber, and means positioned around said sharp freezing chamber for insulating the same from heat conducting relation with the walls of the cabinet.

7. A refrigerating unit, comprising in combination, a cabinet of the one door single compartment type, a cast lining for said cabinet, a portion of this lining having refrigerant conducting coils positioned in heat conducting relation therewith to form a cooling unit, means for insulating that part of the lining forming a cooling unit from the remainder of the lining, and a drip pan positioned under that portion of the cooling unit isolated by the insulating means.

8. A refrigerating unit, comprising a cabinet, a lining therefor formed of relatively high heat conducting material, refrigerant conducting means positioned in heat conducting relation with a portion of said lining, and a strip of insulating material for dividing that portion of the lining in a position adjacent the refrigerant conducting means from the other portion of the lining.

In testimony whereof I affix my signature.

LLOYD G. COPEMAN.